United States Patent
Wang et al.

(10) Patent No.: US 12,138,717 B1
(45) Date of Patent: Nov. 12, 2024

(54) METHOD FOR MANUFACTURING DOUBLE-LAYER FAIR MUGS

(71) Applicant: ZHEJIANG FEIJIAN INDUSTRY AND TRADE CO., LTD., Jinhua (CN)

(72) Inventors: Zhijie Wang, Yongkang (CN); Hong Zhao, Yibin (CN); Daohai Yang, Guizhou Province (CN); Huabo Wang, Shijiazhuang (CN); Liang Chen, Yongkang (CN); Bingjian Zhu, Henan Province (CN); Liang Xu, Yongkang (CN); Huafu Lv, Yongkang (CN)

( * ) Notice: Subject to any disclaimer, the term of this patent is extended or adjusted under 35 U.S.C. 154(b) by 0 days.

(21) Appl. No.: 18/647,637

(22) Filed: Apr. 26, 2024

(30) Foreign Application Priority Data

Dec. 1, 2023 (CN) .......................... 202311639584.2

(51) Int. Cl.
*B23P 15/00* (2006.01)

(52) U.S. Cl.
CPC .................................. *B23P 15/00* (2013.01)

(58) Field of Classification Search
CPC ... B65D 7/04; B65D 7/22; B65D 7/36; B65D 7/38; B65D 2543/00509; B65D 2543/0024; B23P 15/00
See application file for complete search history.

*Primary Examiner* — Lee A Holly
(74) *Attorney, Agent, or Firm* — Vladimir Postnikov

(57) ABSTRACT

A method for manufacturing double-layer fair mugs is disclosed, including steps of a shell processing, a liner processing, and a cup body processing. The liner processing forms an inwardly concave welding surface, and the cup body processing is performed by adopting a water outlet form equipment to stamp horizontally to obtain a water outlet, and then the cup body is taken out and vacuumed to obtain a double-layer fair mug. The cup body is only subjected to a horizontal force, which can avoid more burrs and scratches on an inner wall of the water outlet and thereby improving quality of finished products and production efficiency.

11 Claims, 16 Drawing Sheets

A

METHOD FOR MANUFACTURING DOUBLE-LAYER FAIR MUGS

TECHNICAL FIELD

The present application relates to a method for manufacturing cups, and in particular to a method for manufacturing double-layer fair mugs.

BACKGROUND

Fair mugs, also known as tea pitchers, are a kind of utensil used to hold water, tea soup and other beverages. Traditional metal insulated containers through a directly stamping process out of a water outlet on the containers, while the fair mugs have a small volume, a portion that a lower end liner of the water outlet fitting to a shell accounts for a larger proportion of a whole cup body, which makes a temperature of liquid in the cup body is directly transferred to the shell through the liner to be released to outside, and then the liquid in the cup body cools too quickly, resulting in a decline in a thermal insulation performance of the fair mugs.

A water outlet on the fair mugs is often formed through the stamping process by means of a mold. In production, a cup body semi-finished is clamped by a clamping device, and then a lower die is pressed in from a direction of a rim of cup to form the water outlet, at this time a cup wall will not only be subjected to downward pressure, but also be impacted by a horizontal direction, making an inner wall of the water outlet is easy to appear more burrs and scratches, which need to be polished before into a post processing, affecting production efficiency of the fair mugs and quality of finished products, thus it need to be improved.

SUMMARY

In view of defects in existing technologies, for example, a contact area between the shell and the inner is too large to bring failure of a vacuum layer, resulting in the thermal insulation performance of the fair mugs decreases, and meanwhile by use of the lower die stamps the water outlet along a vertical direction, making the inner wall of the water outlet is easy to appear more burrs and scratches, reducing the production efficiency of the fair mugs and the quality of finished products, the present disclosure provides a method for manufacturing double-layer fair mugs.

To solve the above technical problems, the present disclosure is realized by adopting the following technical solutions.

In some embodiments of the present disclosure, a method for manufacturing double-layer fair mugs is provided, including steps of a shell processing, a liner processing, and a cup body processing.

Herein the shell processing includes following steps of A1 to A4.

A1, Taking a first round piece for stamping step-by-step thereon to obtain a first shell semi-finished product.

A2, Performing a cropping operation on the first shell semi-finished product to obtain a second shell semi-finished product.

A3, Shaping, cutting and flattening for the second semi-finished product to obtain a third shell semi-finished product.

A4, Notching at bottom and drilling for the third shell semi-finished product to obtain the shell with a groove and a vacuum hole at the bottom thereon.

Herein the liner processing includes following steps of B1 to B3.

B1, Taking a second round piece for stamping step-by-step thereon to obtain a first liner semi-finished product.

B2, Performing a molding mouth operation for the first liner semi-finished product to obtain a second liner semi-finished product, and a mouth of the second liner semi-finished product has a welding surface concave inwardly in its diameter direction.

B3, Cutting and flattening for the second liner semi-finished product to obtain the liner.

Herein the cup body processing includes following steps of C1 and C2.

C1, Performing a mouth matching operation for the shell and the liner, and then welding an upper end of the liner onto an upper end of the shell to obtain a cup body semi-finished product with an insulation layer.

C2, Polishing a mouth of the cup body semi-finished product, and then adopting a water outlet form equipment to the cup body semi-finished product for stamping a water outlet operation to obtain the cup body.

Herein the water outlet form equipment includes an equipment platform movable disposed, a driving component, a water outlet form block, an adjusting element, a clamping part and a supporting member.

Herein the clamping part is movably provided on the equipment platform and the clamping part is further provided with a shaping groove; the driving component passes through the supporting member, the adjusting element is provided on the driving component and goes through from the supporting member.

Herein the water outlet form block is slidingly provided on the adjusting element, the driving component drives the adjusting element to slide back and forth in a vertical direction, and the water outlet form block moves synchronously with the adjusting element in a horizontal direction and slides along a direction close to or away from the shaping groove.

Herein stamping the water outlet operation includes following steps of D1 to D4.

D1, Firstly activating the driving component to move the adjusting element upwardly into place, and then taking the cup body semi-finished product to place on the adjusting element.

D2, Secondly activating the equipment platform to move the clamping part in a direction close to the adjusting element. Herein the clamping part clamps on an outside of the cup body semi-finished product and pushes the adjusting element together with the cup body semi-finished product downwardly into place.

D3, Thirdly individually pushing the water outlet form block via the driving component to slide horizontally into place in a direction close to the shaping groove, and meanwhile punching the water outlet on the cup body semi-finished product to obtain the cup body.

D4, Lastly driving the clamping part via the equipment platform to move upward, the driving component drives the adjusting element, the cup body and the equipment platform to move upward synchronously, and the driving component stops working when the adjusting element and the cup body move upwardly in place; the equipment platform continues to move upward until the clamping part is detached from the cup body, at this time the equipment platform stops driving the clamping part upward, and then the cup body is removed and vacuumed to obtain a double-layer fair mug.

As a preferred method for manufacturing double-layer fair mugs, a difference between a diameter of the welding surface and a diameter of the second liner semi-finished product ranges from 0.5 mm to 1.5 mm.

As a preferred method for manufacturing double-layer fair mugs, before performing the cutting in B3, a height difference between an upper end of the welding surface and an upper end of the second liner semi-finished product ranges from 7.7 mm to 8.5 mm.

As a preferred method for manufacturing double-layer fair mugs, the shaping in A3 includes following steps of A31 and A32.

A31, Stamping and bulging the second shell semi-finished product by using a beef tendon mold to bring the second semi-finished product form a conical structure with a small upper part and a large lower part, wherein a difference between a maximum outer diameter of a lower end of the second semi-finished product and a minimum outer diameter of an upper end of the second semi-finished product ranges from 14.6 mm to 15.4 mm.

A32, Performing a water swelling operation to stretch the second semi-finished product, so that a bottom of the second semi-finished product forms a platform protruding towards an interior of the shell.

As a preferred method for manufacturing double-layer fair mugs, the groove is provided several, all grooves are recessed towards the interior of the shell, and the grooves are distributed at a bottom of the shell along a direction of a diameter of the shell. The grooves have different radii, a groove having a largest radius is distributed at a bottom center of the shell, and the other grooves are distributed on both sides of the groove having the largest radius in order of radius from the largest to the smallest. The vacuum hole and the groove having the largest radius are coaxially disposed with the shell.

On the one hand, when manufacturing the water outlet, the adjusting element drives the water outlet form block to slide horizontally to close to the shaping groove, so that the water outlet of the cup body is only subjected to a force in the horizontal direction during the molding process, which avoids the occurrence of a large number of burrs and scratches on the inner side wall of the water outlet, thereby improving the quality of the finished product of the water outlet of the cup body and the production efficiency of the fair mugs.

On the other hand, the present disclosure adopts further processing in the mouth of the liner to process an inwardly concave welding surface for welding with the shell, and then horizontally moves the water outlet form block to manufacture the water outlet on the semi-finished product of the cup body, which not only can reserve a space when extruding the mouth of the semi-finished product of the cup body to avoid the shell and the liner from being extruded to completely fit together, but also makes the water outlet on the molded cup body have a gap between the shell and the liner relative to the water outlet of existing fair mugs, which in turn reduces the contact area between the shell and the liner at a lower end of the water outlet, so that a failure point of an insulation layer formed by the contact between the shell and the liner is located at a higher level of the liquid level in the fair mug, avoiding premature contact between the liquid level in the fair mug and the failure point of the insulation layer, thus the product has a better heat preservation performance.

The groove can enhance a structural strength of the bottom of the cup body semi-finished product, which makes the equipment platform and the clamping part not easy to deform when they are fixed on the outside of the cup body semi-finished product, and further improves the production efficiency and quality of the fair mugs. Moreover, a vacuuming operation is performed through the vacuum hole to create a vacuum between the shell and the liner, thus blocking temperature conduction and further improving the insulation performance of the fair mugs.

The supporting member can achieve a restriction on a direction of movement of the driving component, thus guaranteeing the accuracy of the adjusting element when it drives the water outlet form block to move.

As a preferred method for manufacturing double-layer fair mugs, the adjusting element includes an adjusting column and a placing table. The placing table is provided on the adjusting column, the placing table is provided with a horizontal chute, and the water outlet form block is slidably provided in the horizontal chute. The adjusting column is slidably provided with a push rod inside, a top of the push rod is provided with a thrust block protruding from a top of the placing table, a lower end of the push rod is disposed on the driving component, and the driving component drives the push rod and the thrust block reciprocating slip in the vertical direction. A side of the thrust block facing the horizontal chute is provided with a thrust bevel, a top of the thrust bevel is inclined away from the horizontal chute, and the thrust bevel is provided with a dovetail groove extending along a height of the thrust block, the water outlet form block is provided with a dovetail joint dovetailed into the dovetail groove, and the thrust block drives the water outlet form block through the dovetail groove and the dovetail joint for synchronized sliding in the horizontal direction.

By adopting of the thrust bevel, the dovetail groove and the dovetail joint to realize a sliding way of the thrust block driving the water outlet form block, which not only can improve the tightness of the connection between the thrust block and the water outlet form block, but also can improve the consistency and smoothness of the movement of the thrust block and the water outlet form block. The setting of the horizontal chute realizes the limitation of the sliding direction of the water outlet form block, which can avoid the deviation between the water outlet form block and the shaping groove when the water outlet form block is stamping the water outlet, and further can improve the quality of the finished product.

As a preferred method for manufacturing double-layer fair mugs, the adjusting element further includes a positioning block disposed on the placing table, the positioning block is provided with a movable slot, the water outlet form block and the thrust block are slidably provided in the movable slot. The positioning block is circumferentially provided with a faying surface outwardly protruding on an outer side wall thereon, the faying surface is adherent to an inner surface of the welding surface, and the clamping part is clamped to an outer side of the positioning block.

On the one hand, the movable slot can realize the restriction of an upper limit and direction of the slip of the thrust block and the water outlet form block, which further improves the consistency of the synchronized movement of the thrust block and the water outlet form block and thereby ensuring the subsequent production of the fair mugs. On the other hand, a pre-positioning of the cup body semi-finished product is realized when the cup body semi-finished product is covered on the outside of the positioning block, which facilitates a precise clamping of the clamping part on the outside of the cup body semi-finished product. The interaction between the positioning block and the clamping part makes the cup body semi-finished product not easy to deform and bend on the other surfaces of the cup body semi-finished product except for the water outlet during the stamping process. The tightness of the fitting surface between the liner and the clamping part further ensures that the liner and the shell cannot be completely fitted with each other after squeezing, and further strengthens the heat preservation effect of the fair mugs.

As a preferred method for manufacturing double-layer fair mugs, the driving component includes a water outlet driving member and a cup body driving member. The water outlet driving member is threadedly connected with the push rod, an upper end of the cup body driving member is disposed on the adjusting column, and the cup body driving member drives the adjusting element reciprocating motion in the vertical direction.

The water outlet driving member realizes a separate driving of the push rod, which reduces an interference of the push rod suffered when sliding. The cup body driving member realizes a slippage of overall position of the adjusting element, which not only facilitates a user to remove the cup body from the placing table or to place the cup body semi-finished product on the placing table, but also enables to cooperate the clamping part for moving, thereby can prevent the clamping part from colliding with the cup body or the cup body semi-finished product placed on the adjusting element.

As a preferred method for manufacturing double-layer fair mugs, the clamping part includes at least two clamping flaps, the clamping flaps are circumferentially surrounded and moving in a direction close to or away from each other, and the shaping groove is disposed on an inner side wall of one of the clamping flaps. The clamping part further includes guide rods corresponding to the clamping flaps one-to-one, one end of the guide rods is disposed on respective corresponding clamping flaps, the other end of the guide rods protrudes from the equipment platform, the guide rods are sleeved with resilient reset components, both ends of the resilient reset components against the guide rods and the equipment platform respectively, and the resilient reset components push the clamping flaps in a direction away from each other.

By controlling a spacing between the clamping flaps, it is easy to clamp the cup body semi-finished product and also easy to detach the clamping part from the outside of a molded cup. The guide rods act as guides when the clamp flaps are sliding, which can improve the smoothness of the clamping flaps when they are moving close to or away from each other. The setting of the resilient reset component realizes an automatic reset of the clamping flaps, which facilitates the smooth progress of subsequent steps. At the same time, the resilient reset component increases a total height difference when the clamping part is clamping the cup body semi-finished product, so that the clamping part and the equipment platform can be applied to the cup body semi-finished precuts with different heights, which can guarantee the consistency of the mouth of the cup body, and also can improve the accuracy of the adjusting element when stamping the water outlet.

As a preferred method for manufacturing double-layer fair mugs, the supporting member is provided with a protecting stand on an upper surface thereof, the protecting stand is provided with a protective chamber, and an upper end of the adjusting column penetrates into the protective chamber. The protecting stand is provided with a clamping guide surface on an inner side wall thereon, a top of the clamping guide surface is inclined in a direction close to an outer side wall of the protecting stand, and the clamping guide surface is in contact with an outer wall of the clamping flaps.

When stamping a water outlet operation on the cup body semi-finished product, the protecting stand and the protective chamber realize an enclosure protection for the cup body semi-finished product and the clamping part. The clamping guide surface supports and guides the ends of the clamping flaps, which can further improve the smoothness of the movement of the clamping flaps along a direction of mutual proximity, and thereby realizing functions of the clamping flaps clamp accurately and gently on the outside of the cup body semi-finished product.

As a preferred method for manufacturing double-layer fair mugs, the equipment platform is provided with a first step, the clamping flaps are provided with bar blocks, and the clamping flaps are slidably disposed on the first step by means of the bar blocks. The equipment platform is provided with a bump on a lower surface thereon, and a lower surface of the bump is opened with a cup body fixed groove, an inner side wall of the clamping flaps is opened with placement notches, and the bump is located between the placement notches. The clamping part is formed in a clamped state and a reset state, and when in the clamped state, adjacent clamping parts are abutted against each other, the bump is inserted into the placement notches, the cup body fixed groove is located between the clamping flaps and in contact with an end of the cup body semi-finished product, and the bar block moves inwardly along the first step. When in the reset state, the adjacent clamping parts are separated from each other, the bump exits from within the placement notches, and the bar block moves outwardly along the first step.

Setting of the first step and the bar block can increase the tightness of the connection between the clamping flaps and the equipment platform, which further improves the smoothness of sliding of the clamping flaps. The bump and the placement notches realize the limitation of the moving distance of the clamping flaps, preventing the collision of the adjacent clamping flaps, and facilitating a fast and accurate conversion of the clamping part to the clamping state. On the other hand, the equipment platform is clamped to the cup body semi-finished product by means of the cup body fixed groove, which further improves the stability of the cup body semi-finished product during stamping the water outlet.

DETAILED DESCRIPTION OF THE EMBODIMENTS

Figure 1:
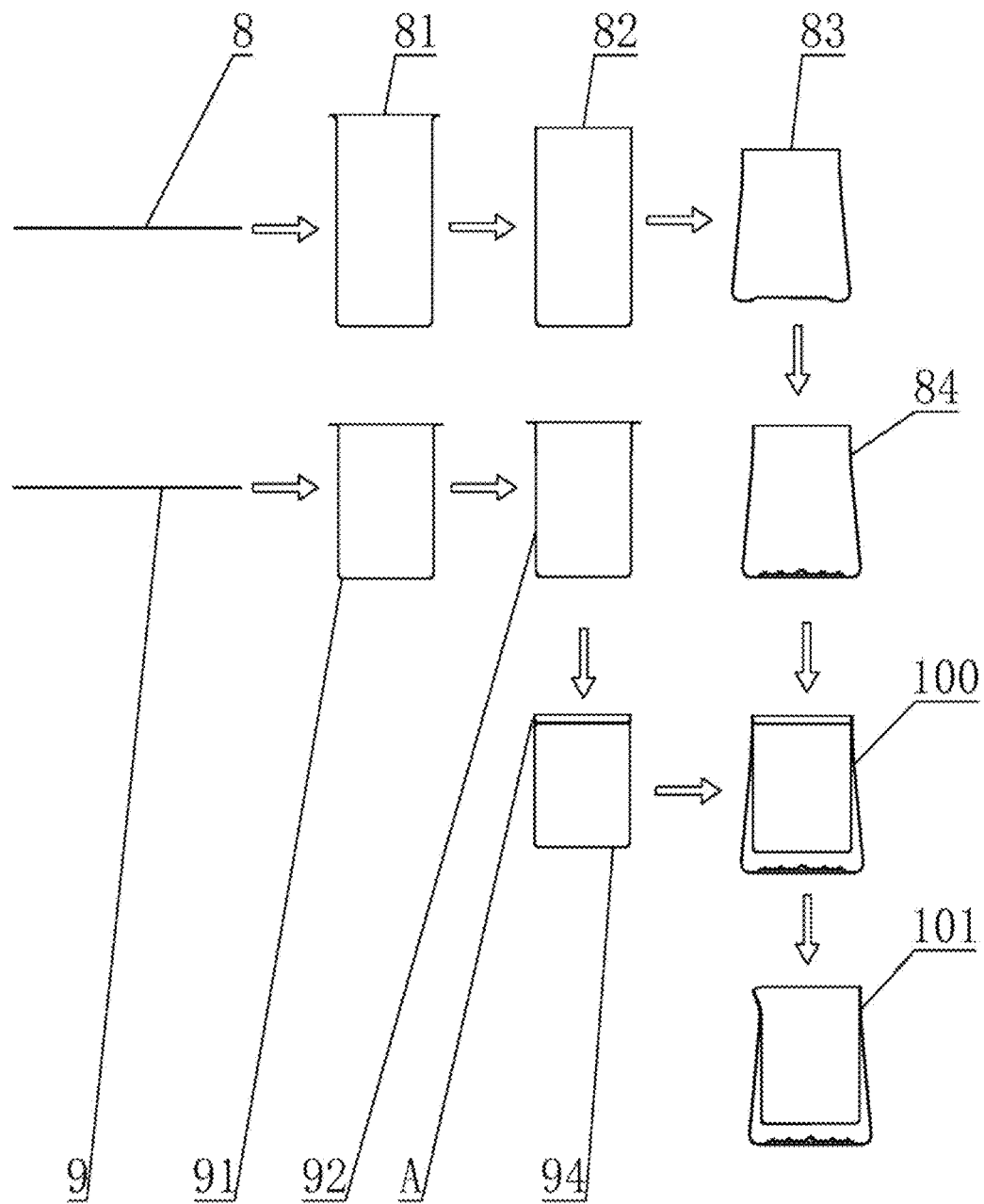
FIG. 1 shows a flow chart of a method for manufacturing double-layer fair mugs in accordance with some embodiments of the present disclosure.

The present disclosure will be described in further detail below in conjunction with FIG. 1 to FIG. 16 of accompanying drawings and specific embodiments, but they are not a limitation of the present invention.

Embodiment 1

As shown in FIG. 1 to FIG. 16, in embodiment 1 of the present disclosure, a method for manufacturing double-layer fair mugs is provided, including steps of a shell 84 processing, a liner 94 processing, and a cup body 101 processing.

Herein the shell 84 processing includes following steps of A1 to A4.

A1, Taking a first round piece 8 for stamping step-by-step thereon to obtain a first shell semi-finished product 81.

A2, Performing a cropping operation on the first shell semi-finished product 81 to obtain a second shell semi-finished product 82.

A3, Shaping, cutting and flattening for the second semi-finished product 82 to obtain a third shell semi-finished product 83.

A4, Notching at bottom and drilling for the third shell semi-finished product 83 to obtain the shell 84 with a groove 841 and a vacuum hole 842 at the bottom thereon.

Herein the liner 94 processing includes following steps of B1 to B3.

B1, Taking a second round piece 9 for stamping step-by-step thereon to obtain a first liner semi-finished product 91.

B2, Performing a molding mouth operation for the first liner semi-finished product 91 to obtain a second liner semi-finished product 92, and a mouth of the second liner semi-finished product 92 has a welding surface 93 concave inwardly in its diameter direction.

B3, Cutting and flattening for the second liner semi-finished product 92 to obtain the liner 94.

Herein the cup body 101 processing includes following steps of C1 and C2.

C1, Performing a mouth matching operation for the shell 84 and the liner 94, and then welding an upper end of the liner 94 onto an upper end of the shell 84 to obtain a cup body semi-finished product 100 with an insulation layer.

C2, Polishing a mouth of the cup body semi-finished product 100, and then adopting a water outlet form equipment to the cup body semi-finished product 100 for stamping a water outlet operation to obtain the cup body 101.

Herein the water outlet form equipment includes an equipment platform 1 movable disposed, a driving component 2, a water outlet form block 3, an adjusting element 4, a clamping part 5 and a supporting member 6. Herein the clamping part 5 is movably provided on the equipment platform 1 and the clamping part 5 is further provided with a shaping groove 51; the driving component 2 passes through the supporting member 6, the adjusting element 4 is provided on the driving component 2 and goes through from the supporting member 6.

Herein the water outlet form block 3 is slidingly provided on the adjusting element 4, the driving component 2 drives the adjusting element 4 to slide back and forth in a vertical direction, and the water outlet form block 3 moves synchronously with the adjusting element 4 in a horizontal direction and slides along a direction close to or away from the shaping groove 51.

Herein stamping the water outlet operation includes following steps of D1 to D4.

D1, Firstly activating the driving component 2 to move the adjusting element 4 upwardly into place, and then taking the cup body semi-finished product 100 to place on the adjusting element 4.

D2, Secondly activating the equipment platform to move the clamping part 5 in a direction close to the adjusting element 4. Herein the clamping part 5 clamps on an outside of the cup body semi-finished product 100 and pushes the adjusting element 4 together with the cup body semi-finished product 100 downwardly into place.

D3, Thirdly individually pushing the water outlet form block 3 via the driving component 2 to slide horizontally into place in a direction close to the shaping groove 51, and meanwhile punching the water outlet on the cup body semi-finished product 100 to obtain the cup body 101.

D4, Lastly driving the clamping part 5 via the equipment platform 1 to move upward, the driving component 2 drives the adjusting element 4, the cup body 101 and the equipment platform 1 to move upward synchronously, and the driving component 2 stops working when the adjusting element 3 and the cup body 101 move upwardly in place; the equipment platform 1 continues to move upward until the clamping part 5 is detached from the cup body 101, at this time the equipment platform 1 stops driving the clamping part 5 upward, and then the cup body 101 is removed and vacuumed to obtain a double-layer fair mug.

Preferably, the difference between a diameter of the welding surface 93 and a diameter of the second liner semi-finished product 92 is 0.5 mm.

Preferably, before performing the cutting in B3, a height difference between an upper end of the welding surface 93 and an upper end of the second liner semi-finished product 92 is 7.7 mm.

Preferably, the shaping in A3 includes following steps of A31 and A32.

A31, Stamping and bulging the second shell semi-finished product 82 by using a beef tendon mold to bring the second semi-finished product 82 form a conical structure with a small upper part and a large lower part. Herein a difference between a maximum outer diameter of a lower end of the second semi-finished product 82 and a minimum outer diameter of an upper end of the second semi-finished product 82 is 14.6 mm.

A32, Performing a water swelling operation to stretch the second semi-finished product 82, so that a bottom of the second semi-finished product 82 forms a platform protruding towards an interior of the shell.

Preferably, the groove 841 is provided several, all grooves 841 are recessed towards the interior of the shell 84, and the grooves 841 are distributed at a bottom of the shell 84 along a direction of a diameter of the shell 84. The grooves 841 have different radii, a groove 841 having a largest radius is distributed at a bottom center of the shell 84, and the other grooves 841 are distributed on both sides of the groove 841 having the largest radius in order of radius from the largest to the smallest. The vacuum hole 842 and the groove 841 having the largest radius are coaxially disposed with the shell 84.

Specifically, as shown in FIG. 1, when performing step A1, the first round piece 8 is brushed with oil and placed in a mold, and then a hydraulic press is activated to stamp the round piece 8 several times. In the embodiment 1, the first shell semi-finished product 81 with cylindrical is obtained by stamping four times in total, and the first shell semi-finished product 81 with no visible drawing or abrasion is obtained by brushing oil on the outside of the round piece 8 and stamping in stages.

Figure 2:
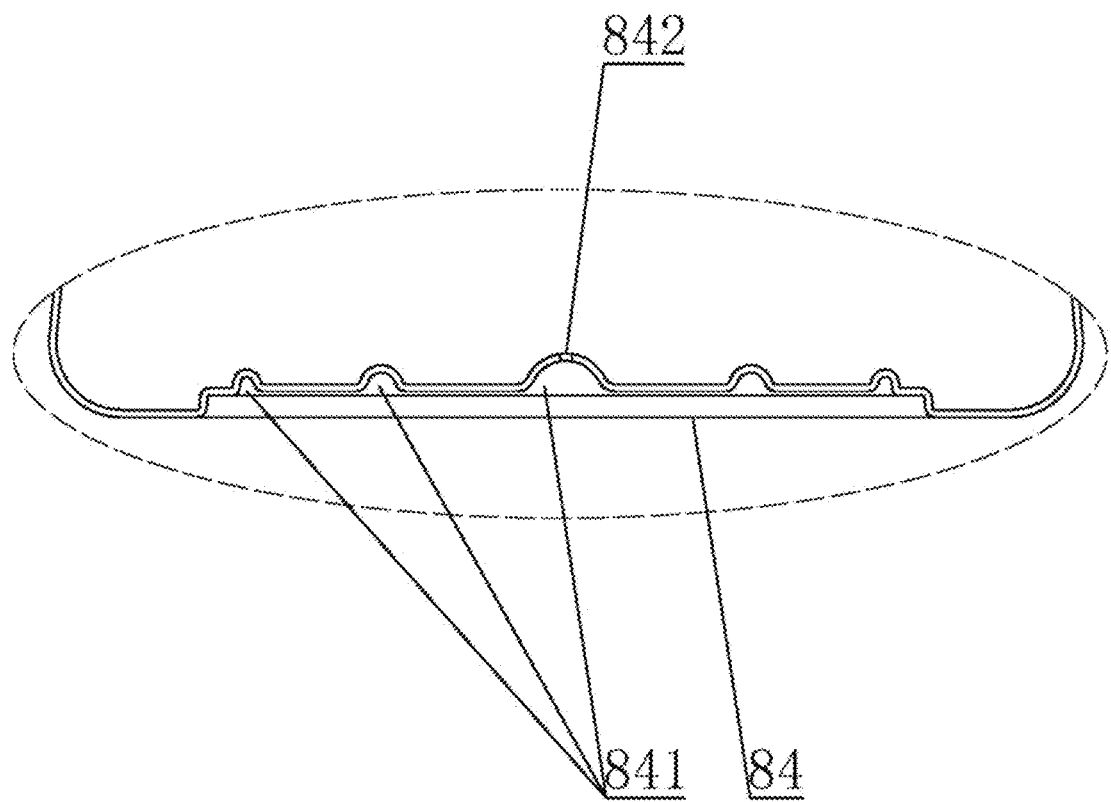
FIG. 2 shows a local structural schematic diagram of a bottom of a shell in accordance with some embodiments of the present disclosure.
Figure 3:
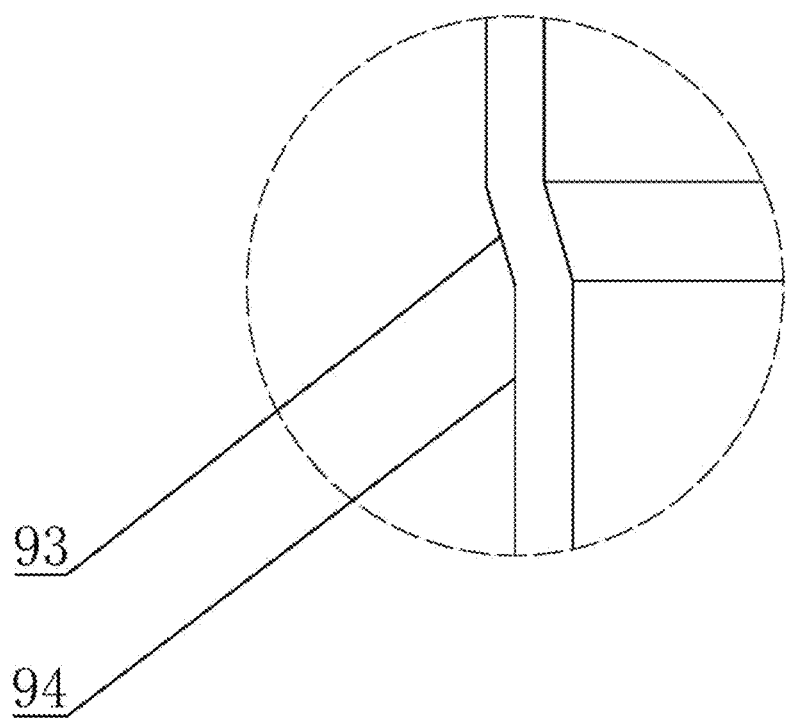
FIG. 3 shows an enlarged view at A in FIG. 1.

As shown in FIG. 1 and FIG. 2, when performing the step A31, the hydraulic press is started so that the sliding block rises until the second shell semi-finished product 82 can enter and exit freely. The second shell semi-finished product 82 is inserted into a lower die cavity and then a work button is started. After an upper mold rises and stops, the second shell semi-finished product 82 is taken out, at this time the second shell semi-finished product 82 in a form of a conical structure with a small upper part and a large lower part. When performing the step A32, the hydraulic press is started so that the sliding block rises until the second shell semi-finished product 82 can enter and exit freely. The second shell semi-finished product 82 having the conical structure with the small upper part and the large lower part is inserted into the lower die cavity, and then the work button is activated to stamp out the platform with an inwardly concave bottom, and then the second semi-finished product 82 is removed when the upper mold rises to a stop.

More specifically, as shown in FIG. 1 and FIG. 2, when performing step A4, five semicircular grooves 841 are obtained by bottom punching and concaving, the grooves 841 are distributed at the bottom of the shell 84 along a diameter direction of the shell 84. Herein two grooves 841 have the smallest radius, two grooves 841 have medium radius, and one groove 841 has the largest radius.

More specifically, as shown in FIG. 1 to FIG. 5, when performing the step B1, the second round piece 9 is brushed with oil and placed in the mold, and then the hydraulic press is started to stamp the second round piece 9 in stages. In this embodiment, a total of three stampings are made to obtain the first liner semi-finished product 91 in a cylindrical shape, and the first liner semi-finished product 91 with no visible drawing or scuffing is obtained by brushing oil on the outside of the second round piece 9 and stamping it in stages.

When perform step B2, the hydraulic press is started, the first liner semi-finished product 91 is brushed oil and placed into the mold, the start button is pressed and after the upper mold rises, the lower die ejects the second liner semi-finished product 92, at this time the second liner semi-finished product 92 is formed with an inwardly concave welding surface 93, and an upper end of the welding surface 93 is inclined outwardly.

Figure 4:
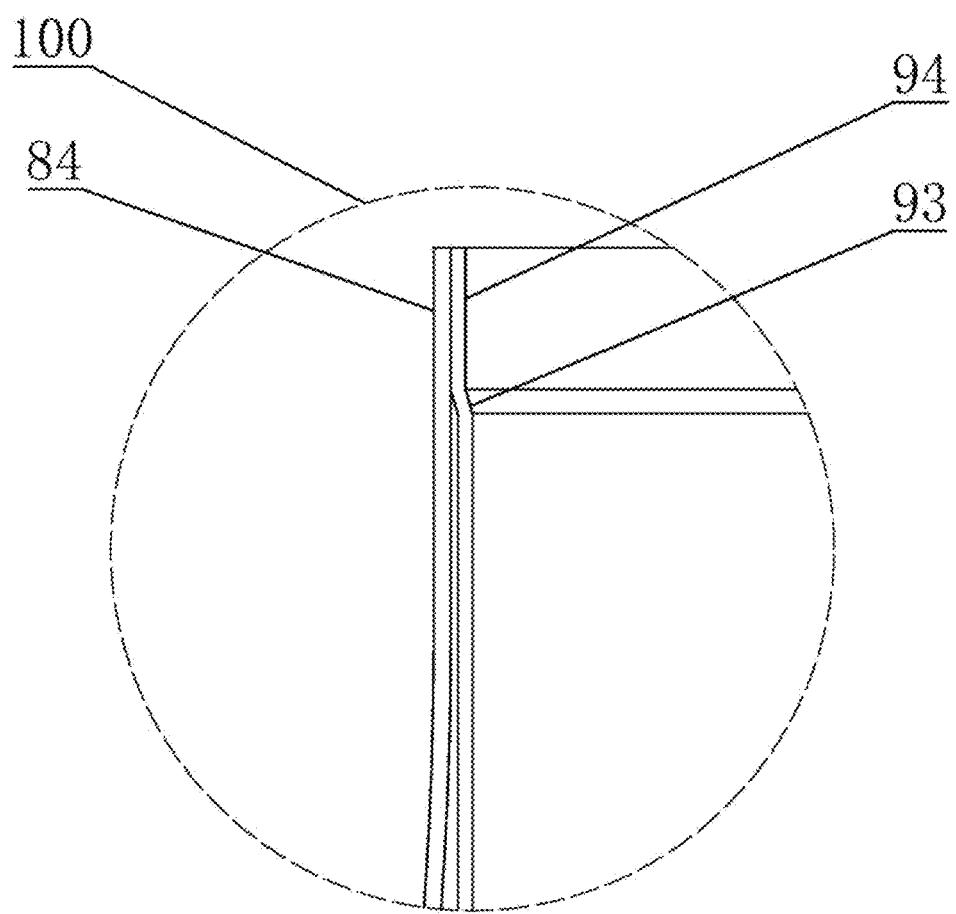
FIG. 4 shows a local structural schematic diagram of a mouth of a cup body semi-finished product in accordance with some embodiments of the present disclosure.
Figure 5:
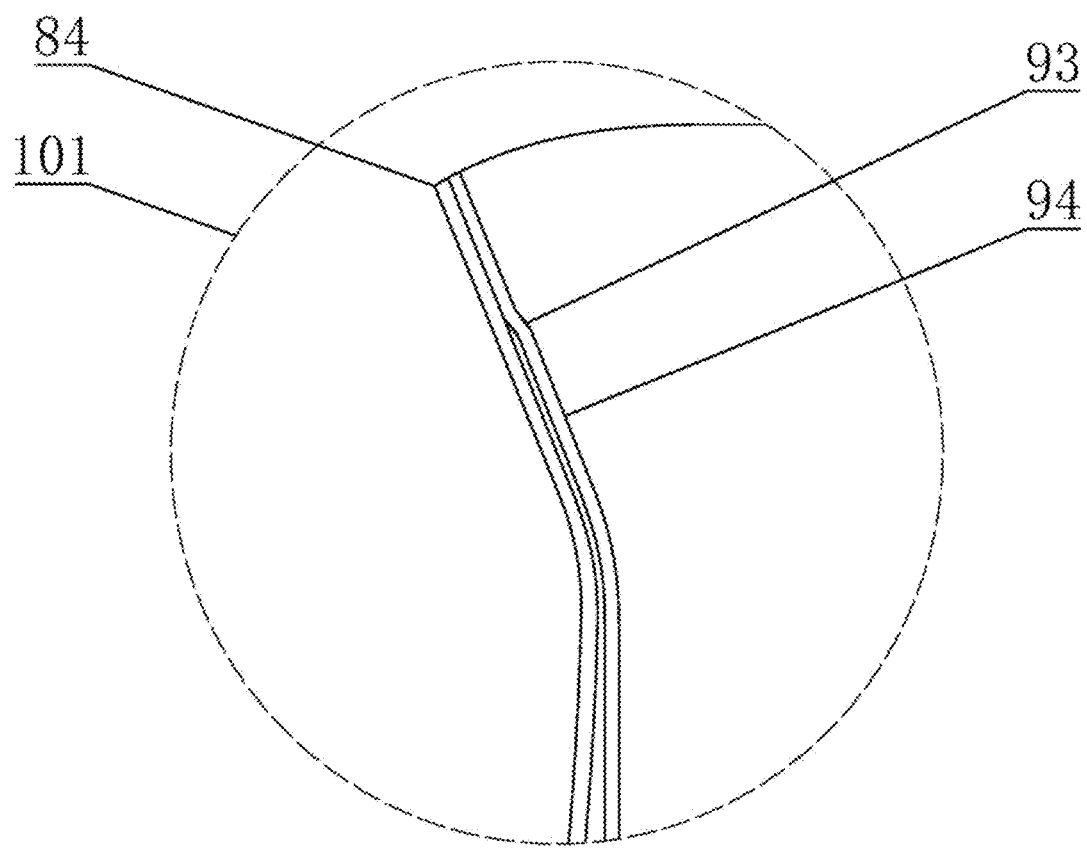
FIG. 5 shows a local structural schematic diagram of a mouth of a cup body in accordance with some embodiments of the present disclosure.

As shown in FIG. 1 and FIG. 4, when processing and forming the cup body 101, the liner 94 is first placed into the shell 84, and then the an upper end of the liner 94 is welded onto the upper end of the shell 84 to obtain the cup body semi-finished product 100, at this time there is an insulation gap formed between the liner 94 and the shell 84 by means of the welding surface 93.

Preferably, the adjusting element 4 includes an adjusting column 41 and a placing table 42. The placing table 42 is provided on the adjusting column 41, the placing table 42 is provided with a horizontal chute 420, and the water outlet form block 3 is slidably provided in the horizontal chute 420. The adjusting column 41 is slidably provided with a push rod 43 inside, a top of the push rod 43 is provided with a thrust block 44 protruding from a top of the placing table 42, a lower end of the push rod 43 is disposed on the driving component 2, and the driving component 2 drives the push rod 43 and the thrust block 44 reciprocating slip in the vertical direction. A side of the thrust block 44 facing the horizontal chute 420 is provided with a thrust bevel 440, a top of the thrust bevel 440 is inclined away from the horizontal chute 420, and the thrust bevel 440 is provided with a dovetail groove 441 extending along a height of the thrust block 44, the water outlet form block 3 is provided with a dovetail joint 31 dovetailed into the dovetail groove 441, and the thrust block 44 drives the water outlet form block 3 through the dovetail groove 441 and the dovetail joint 31 for synchronized sliding in the horizontal direction.

Preferably, the adjusting element 4 further includes a positioning block 45 disposed on the placing table 42, the positioning block 45 is provided with a movable slot 451, the water outlet form block 3 and the thrust block 44 are slidably provided in the movable slot 451. The positioning block 45 is circumferentially provided with a faying surface 452 outwardly protruding on an outer side wall thereon, the faying surface 452 is adherent to an inner surface of the welding surface 93, and the clamping part 5 is clamped to an outer side of the positioning block 45.

Preferably, the driving component 2 includes a water outlet driving member 21 and a cup body driving member 22. The water outlet driving member 21 is threadedly connected with the push rod 43, an upper end of the cup body driving member 22 is disposed on the adjusting column 41, and the cup body driving member 22 drives the adjusting element 4 reciprocating motion in the vertical direction.

Preferably, he clamping part 5 includes at least two clamping flaps 52, the clamping flaps 52 are circumferentially surrounded and moving in a direction close to or away from each other, and the shaping groove 51 is disposed on an inner side wall of one of the clamping flaps 52. The clamping part 5 further includes guide rods 53 corresponding to the clamping flaps 52 one-to-one, one end of the guide rods 53 is disposed on respective corresponding clamping flaps 52, the other end of the guide rods 53 protrude from the equipment platform 1. The guide rods 53 are sleeved with resilient reset components 54, both ends of the resilient reset components 54 against the guide rods 53 and the equipment platform 1 respectively, and the resilient reset components 54 push the clamping flaps 52 in a direction away from each other.

Preferably, the supporting member 6 is provided with a protecting stand 7 on an upper surface thereon, the protecting stand 7 is provided with a protective chamber 71, and an upper end of the adjusting column 41 penetrates into the protective chamber 71. The protecting stand 7 is provided with a clamping guide surface 72 on an inner side wall thereon, a top of the clamping guide surface 72 is inclined in a direction close to an outer side wall of the protecting stand 7, and the clamping guide surface 72 is in contact with an outer wall of the clamping flaps 52.

Preferably, the equipment platform 1 is provided with a first step 11, the clamping flaps 52 are provided with bar blocks 521, and the clamping flaps 52 are slidably disposed on the first step 11 by means of the bar blocks 521. The equipment platform 1 is provided with a bump 12 on a lower surface thereon, and a lower surface of the bump 12 is opened with a cup body fixed groove 13, an inner side wall of the clamping flaps 52 is opened with placement notches 522, and the bump 12 is located between the placement notches 522. The clamping part 5 is formed in a clamped state and a reset state, and when in the clamped state, adjacent clamping parts 52 are abutted against each other, the bump 12 is inserted into the placement notches 522, the cup body fixed groove 13 is located between the clamping flaps 52 and in contact with an end of the cup body semi-finished product 100, and the bar block 521 moves inwardly along the first step 11. When in the reset state, the adjacent clamping parts 52 are separated from each other, the bump 12 exits from within the placement notches 522, and the bar block 521 moves outwardly along the first step 11.

More specifically, when stamping on the water outlet of the fair mug, as shown in FIG. 6 to FIG. 16, four steps may be performed.

Figure 6:
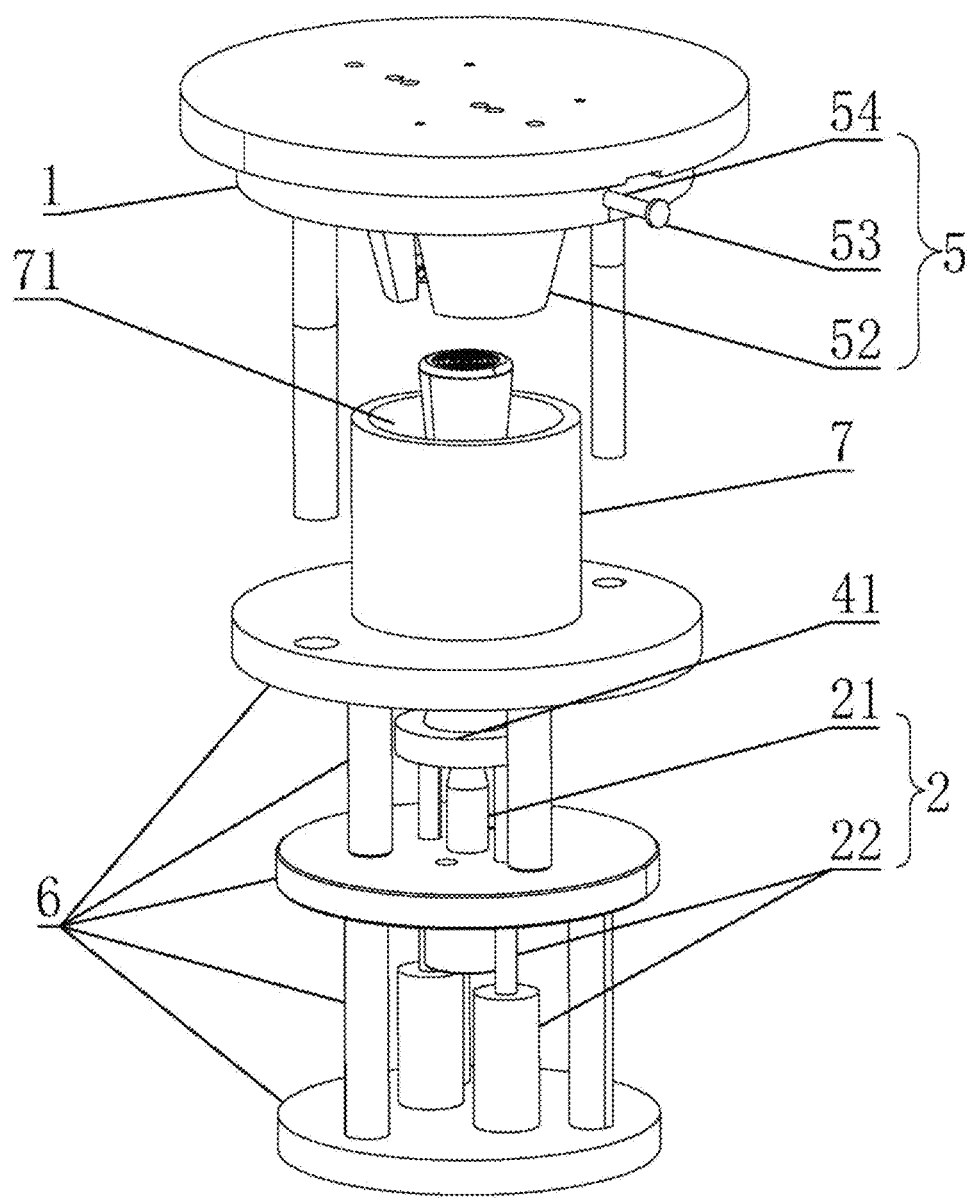
FIG. 6 shows an overall structural schematic diagram of a water outlet form equipment in accordance with some embodiments of the present disclosure.
Figure 7:
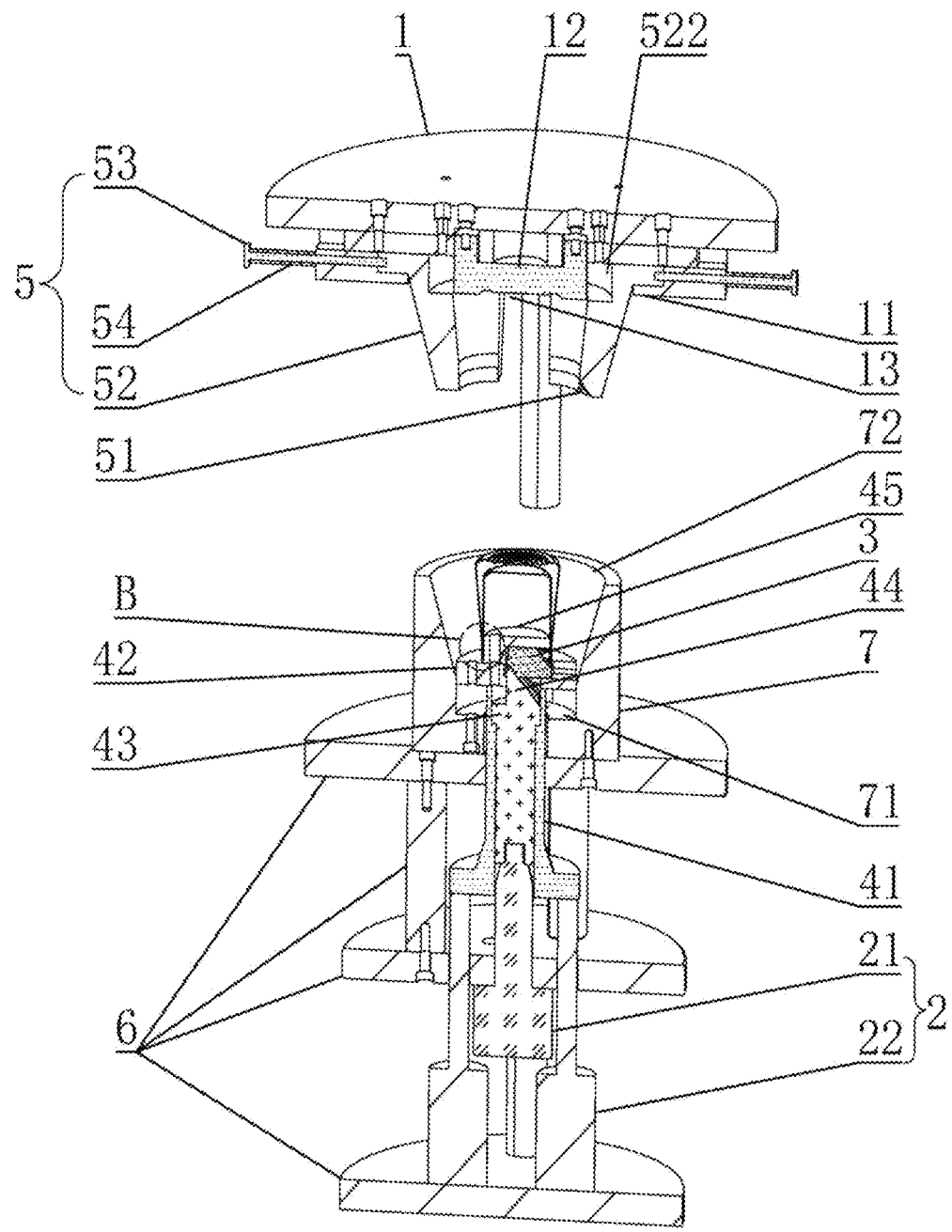
FIG. 7 shows an overall structure sectional view of the water outlet form equipment in accordance with some embodiments of the present disclosure.
Figure 8:
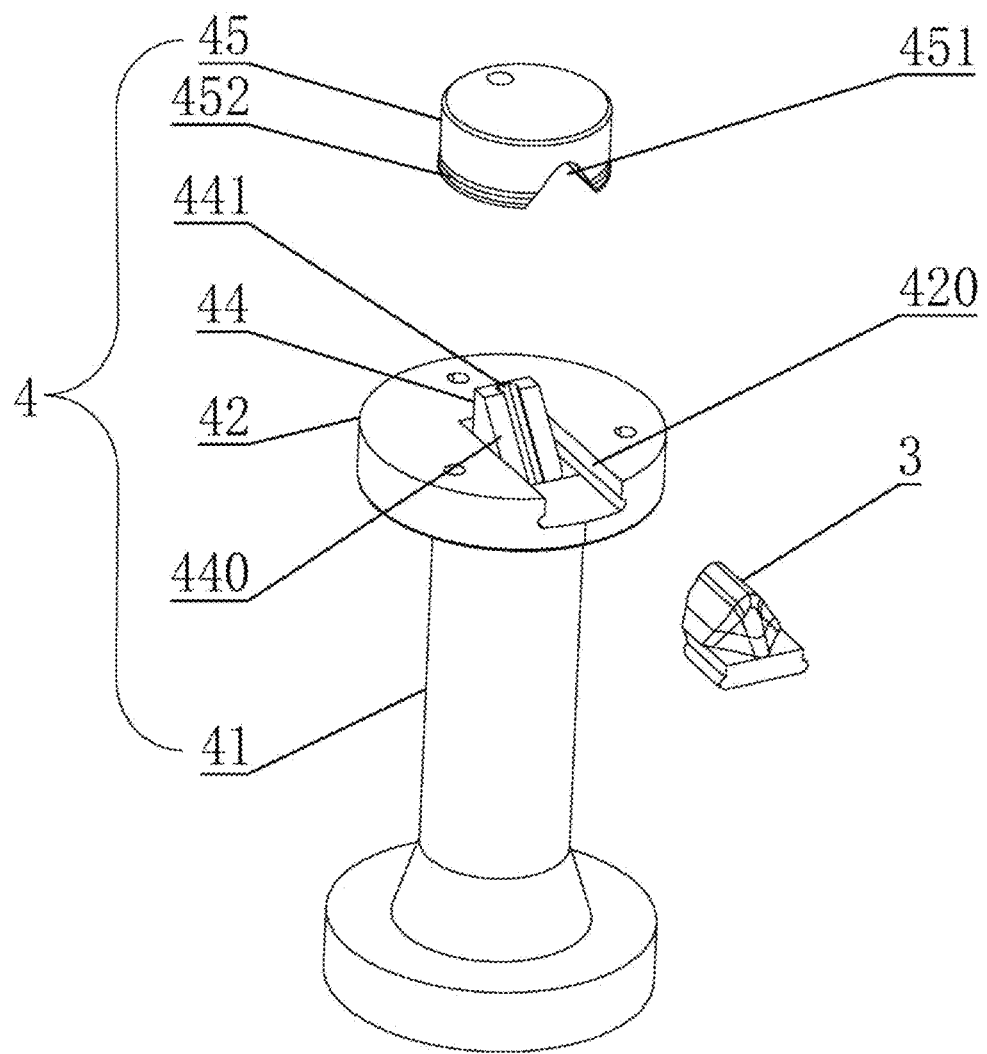
FIG. 8 shows an exploded view of an adjusting element and a water outlet form block in accordance with some embodiments of the present disclosure.
Figure 9:
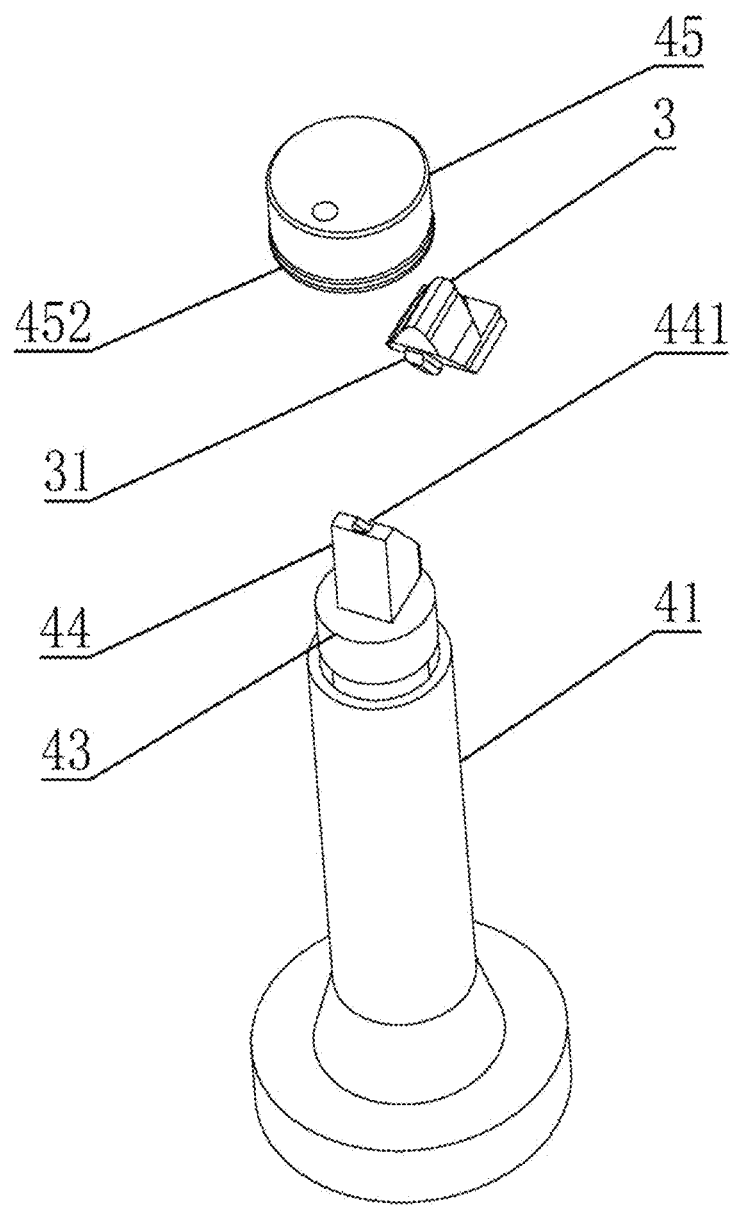
FIG. 9 shows another exploded view of the adjusting element and the water outlet form block after hiding a placing table in accordance with some embodiments of the present disclosure.
Figure 10:
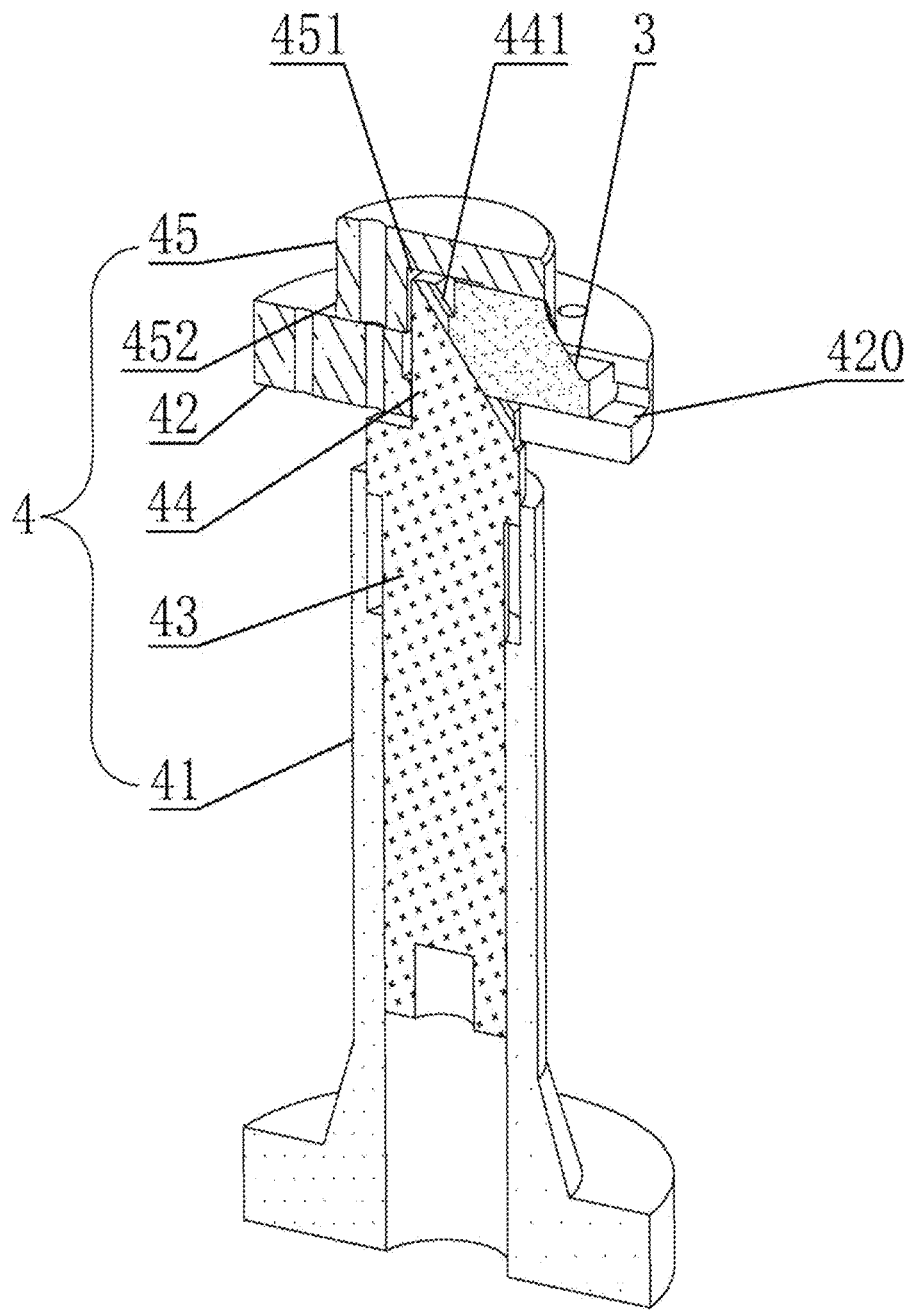
FIG. 10 shows a section view of the adjusting element and the water outlet form block in accordance with some embodiments of the present disclosure.
Figure 11:
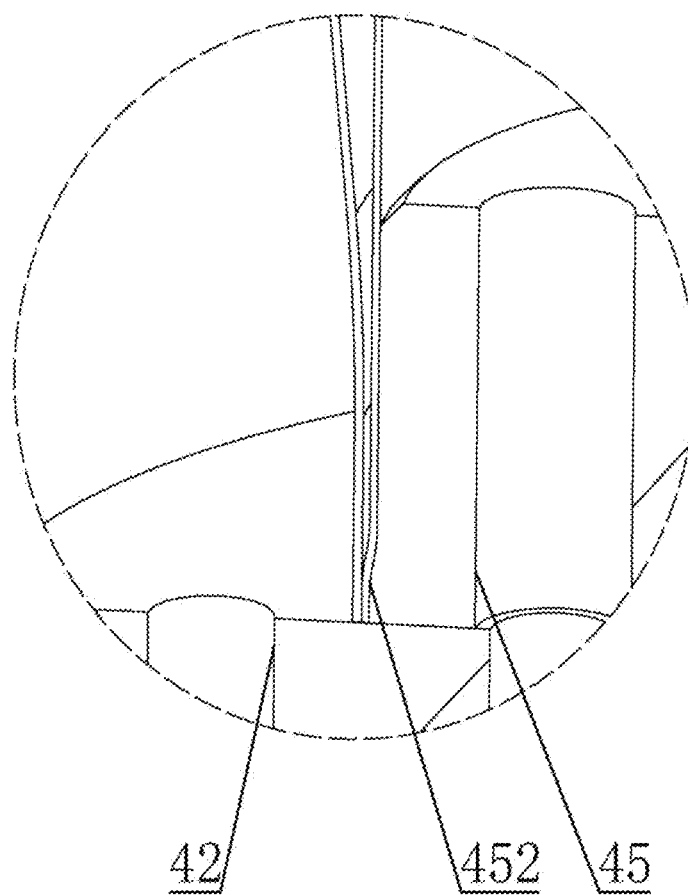
FIG. 11 shows an enlarged view at B in FIG. 7.

When performing the step D1, as shown in FIG. 6, FIG. 7, and FIG. 11, the cup body driving member 22 is activated to push the adjusting column 41 upwardly into place, and then the cup body semi-finished product 100 is sleeved onto the positioning block 45, so that the welding surface 93 is abutted against the faying surface 452.

Figure 12:
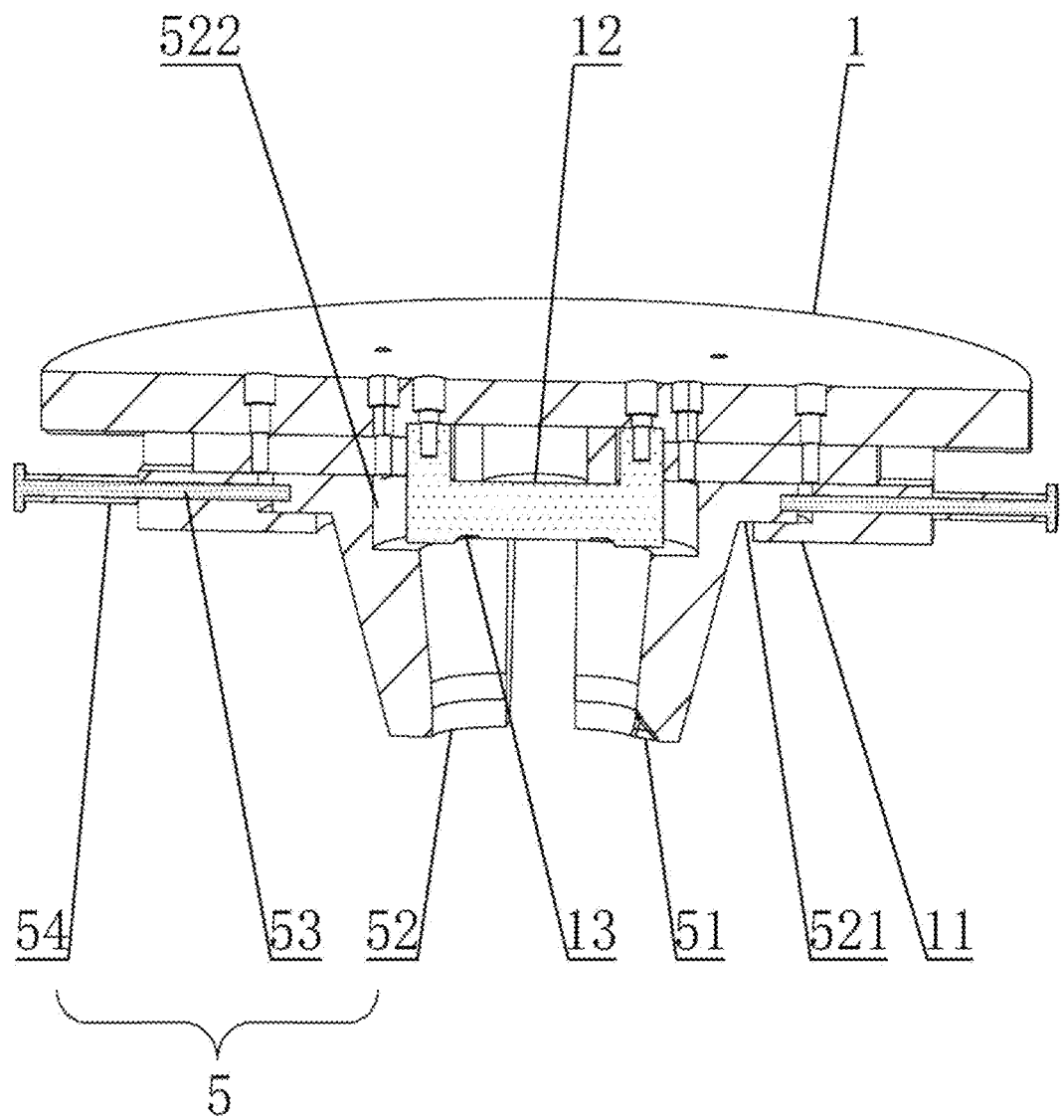
FIG. 12 shows a section view of the adjusting element and an equipment platform in accordance with some embodiments of the present disclosure.
Figure 13:
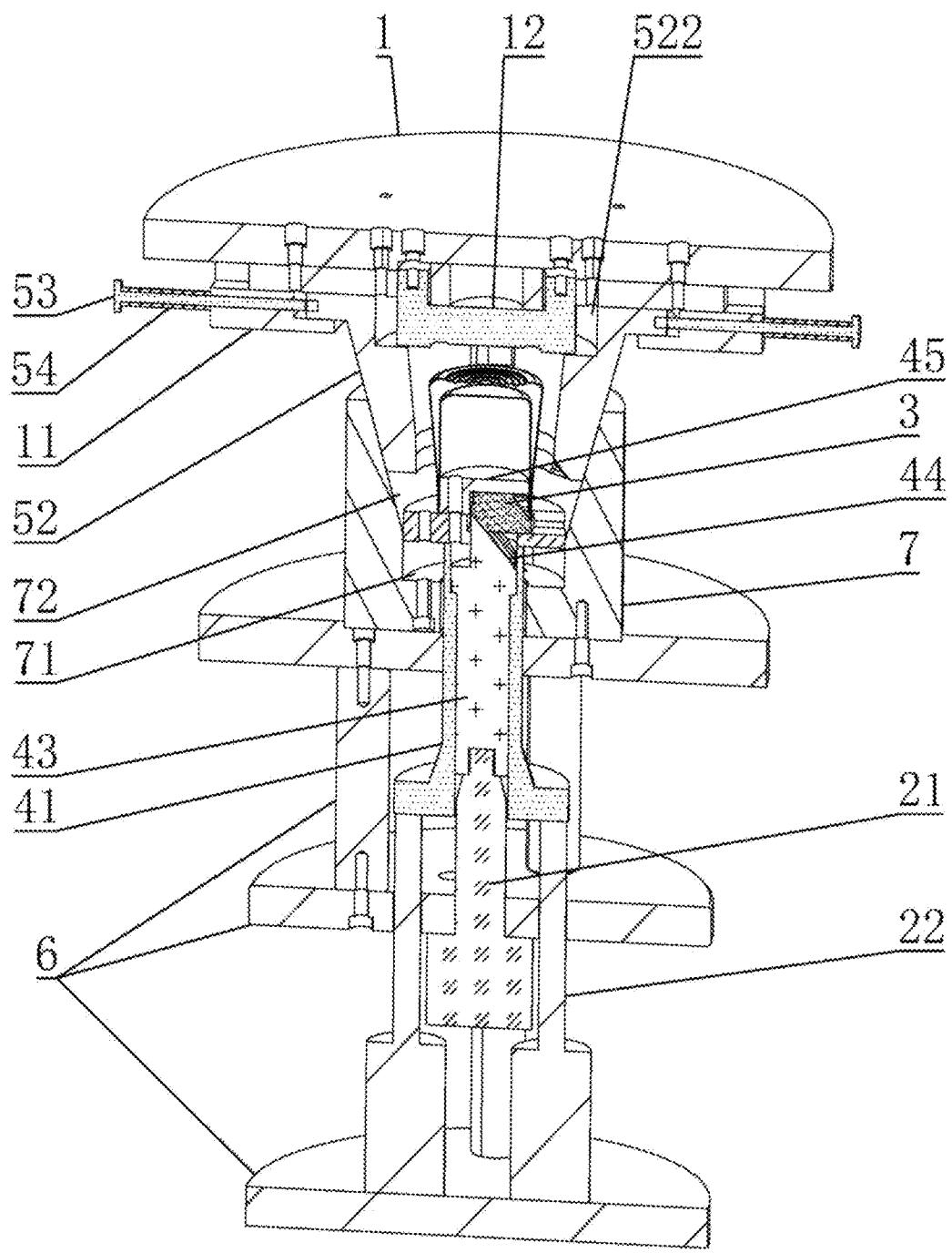
FIG. 13 shows an overall structure sectional view of the clamping part as it switches from a reset state to a clamping state in accordance with some embodiments of the present disclosure.
Figure 14:
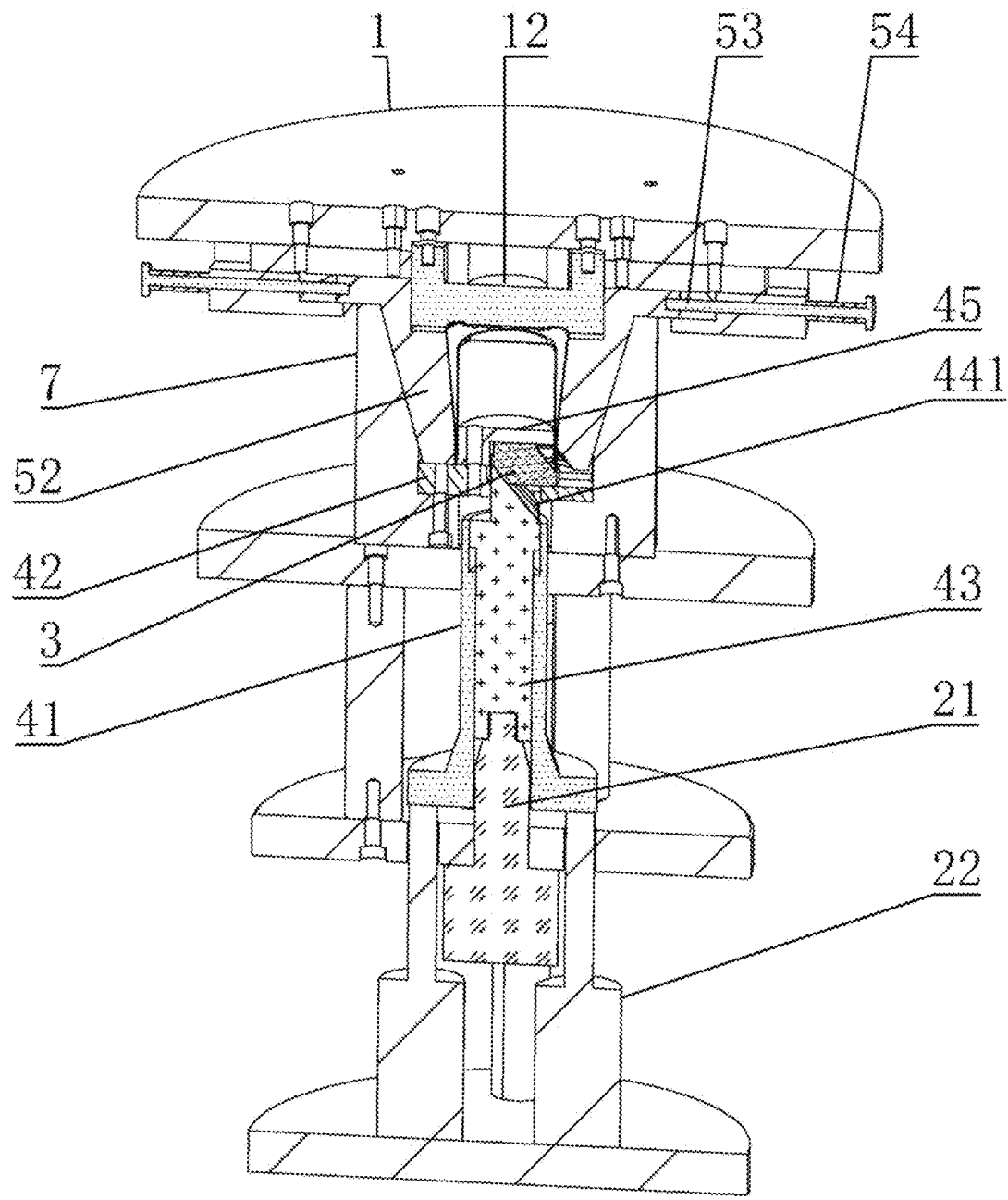
FIG. 14 shows an overall structure sectional view of the clamping part under the clamping state and being clamped to the outside of the cup body semi-finished product in accordance with some embodiments of the present disclosure.
Figure 15:
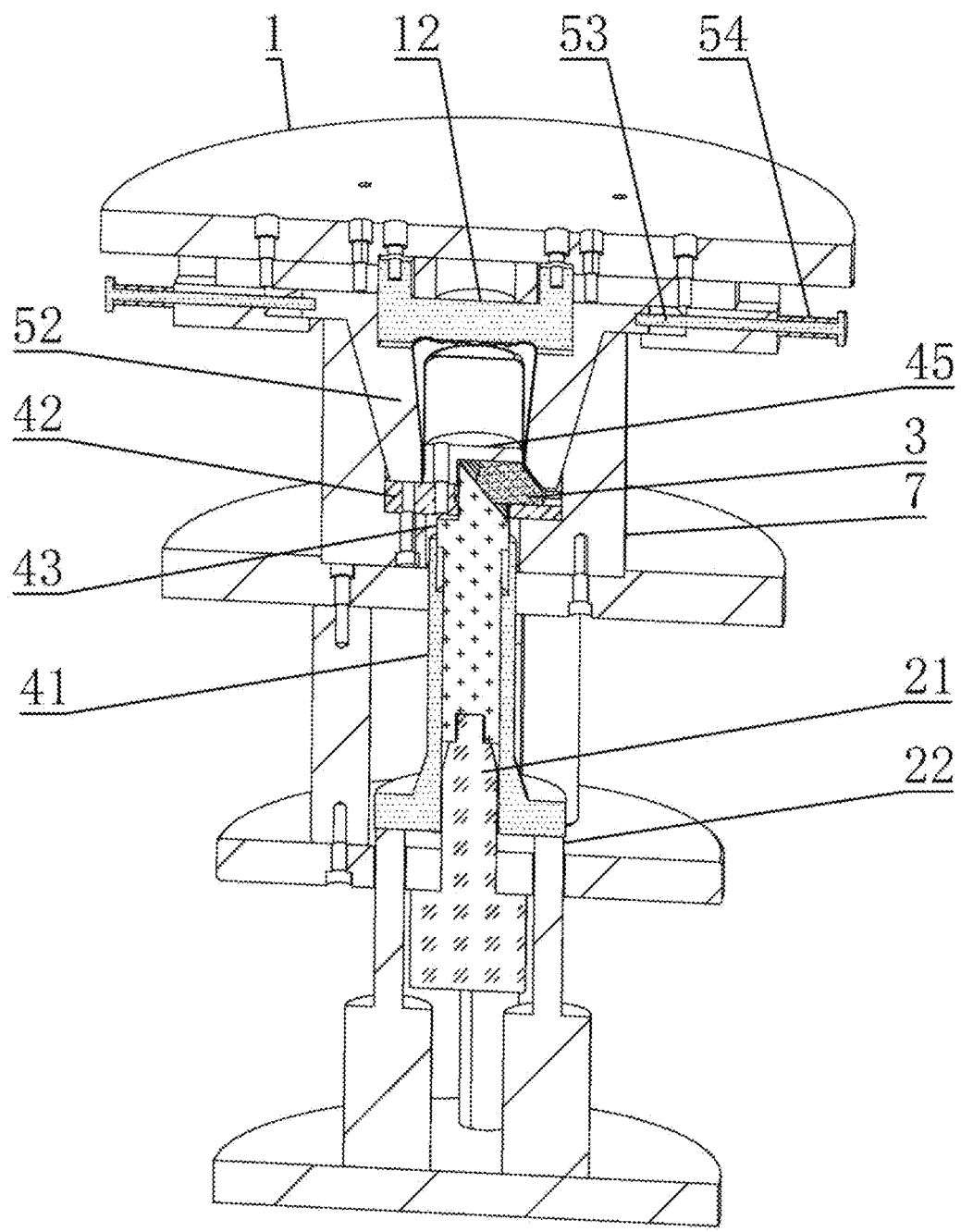
FIG. 15 shows an overall structure sectional view of the water outlet form block moving outward and stamping the water outlet in accordance with some embodiments of the present disclosure.
Figure 16:
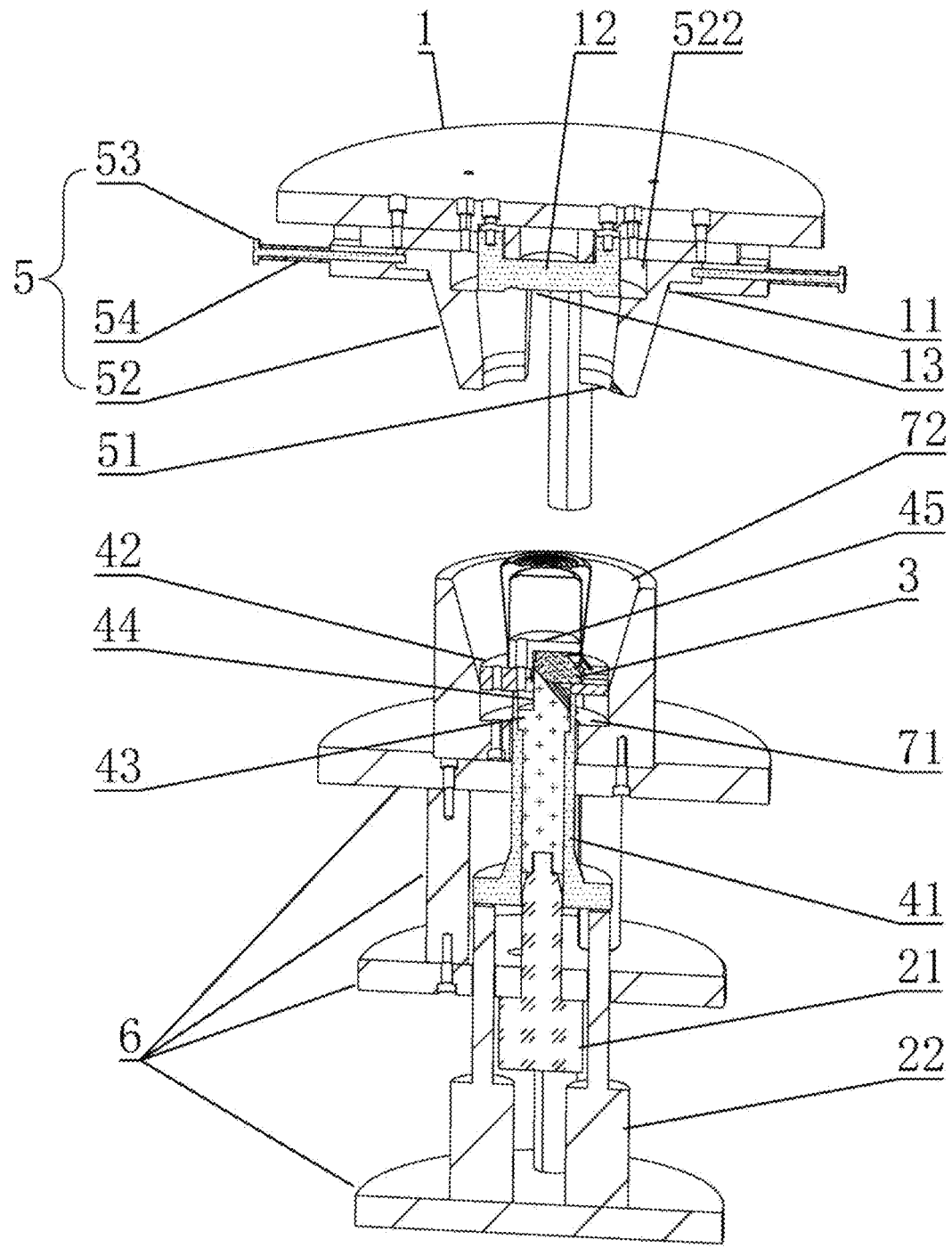
FIG. 16 shows an overall structure sectional view of the water outlet form block moving inwardly in accordance with some embodiments of the present disclosure.

When performing the step D2, as shown in FIG. 11 to FIG. 13, the equipment platform 1 is activated to move the clamping part 5 along the direction close to the positioning block 45. When the lower end of the clamping flaps 52 contacts the clamping guide surface 72, the clamping flaps 52, under the action of the clamping guide surface 72, move in the direction close to each other and collected on the outside of the cup body semi-finished product 100, and the resilient reset component 54 is gradually compressed. With the gradual downward movement of the clamping flaps 52, the lower end of the clamping flaps 52 is placed on the top of the placing table 42 and pushes the adjusting element 4 to move downward as a whole to the lower surface of the placing table 42 to against the bottom inner wall of the protective chamber 71. At this time, the clamping flaps 52 are clamped on the outside of the cup body semi-finished product 100, the top of the cup body semi-finished product 100 is inserted into the cup body fixed groove 13, the resilient reset component 54 continues to be compressed, and then the clamping part 5 completes the fixation of the cup body semi-finished product 100.

In this embodiment, the resilient reset component 54 is made of beef tendon materials, so as be able to cooperate with the clamping guide surface 72 to elastically adjust the clamping flaps 52, thereby increasing the total height difference of the cup body when the clamping part 5 clamps the cup body semi-finished product 100, ensuring the consistency of the mouth of the cup body semi-finished product 100, and also improving the accuracy of the adjusting element 4 when stamping the water outlet. At the same time, the groove 841 enhances the structural strength of the bottom of the cup body semi-finished product 100 so that the cup body semi-finished product 100 is not easy to deform when the equipment platform 1 and the clamping part 5 are clamped on the outside of the cup body semi-finished product 100.

When performing the step D3, as shown in FIG. 8 to FIG. 10 and FIG. 15, the water outlet driving member 21 is activated to move the push rod 43 upwardly, and with the gradual upward movement of the push rod 43, the water outlet form block 3 moves outwardly is pushed by the thrust bevel 440 to move outwardly, at this time the side wall of the cup body semi-finished product 100 deforms and forms the water outlet under the mutual extrusion of the water outlet form block 3 and the shaping groove 51.

When stamping, the inner wall of the liner 94 is only subjected to lateral pressure, which not only avoids more burrs and scratches on the inner wall of the water outlet, but also avoids the shell 84 and the liner 94 being completely adhered to after extrusion. And at the same time, it also makes the water outlet on the cup body 101, relative to the water outlet of existing fair mugs, that there is a gap between the shell 84 and the liner 94, thereby reducing the contact area between the shell and the liner 94, so that a point of failure of the insulation layer formed by the contact between the shell 84 and the liner 94 is made to be located at a higher level of the liquid level in the cup body 101, thereby avoiding the liquid level in the cup body 101 from premature contacting with the point of failure of the insulation layer, thus the product can have better insulation performance.

When performing the step D4, as shown in FIG. 7 to FIG. 13 and FIG. 16, after completed of stamping the water outlet, the equipment platform 1 is first moved upward and the adjusting element 4 is controlled by the cup body driving member 22 to move upward synchronously with the equipment platform 1. The clamping flaps 52 are reset in the direction away from each other by the elastic force of the resilient reset component 54 and are gradually separated from the clamping guide surface 72 and the outer surface of the cup body 101, so as to avoid destroying the cup body 101 when the clamping part 5 moves upward.

After the placing table 42 moves into place, the cup body driving member 22 closes, and the equipment platform 1 that drives the clamping part 5 continues to move upward until the spacing between the inner side walls of the clamping flaps 52 is greater than the maximum outer diameter of the cup body 101. At this time the clamping flaps and the cup body 101 do not interfere with each other, and the clamping part 5 is able to exit from the cup body 101 under the driving of the equipment platform 1. When the clamping part 5 exits from the protective chamber 71 along with the equipment platform 1 in place, the equipment platform 1 closes.

Finally, through the water outlet driving member 21 to drive the push rod 43 to move down until a limit ring is abutted against a bottom side wall of a limit groove. At this time, the water outlet form block 3 moves inwardly and synchronously with the thrust block 44 under the action of the dovetail joint 31 and the dovetail groove 441, thereby causing the water outlet form block 3 to exit from the cup body 101, facilitating the removal of the cup body 101 from the protecting stand 7, thus stamping of the water outlet on the cup body 101 is completed.

Moreover, as shown in FIG. 1 and FIG. 2, the vacuum operation is carried out on the cup body 101 by means of the vacuum hole 842, the double-layer fair mug is obtained. In addition to the above steps, the above steps may be added or subtracted according to actual needs.

Embodiment 2

As a preference, the difference between the diameter of the welding surface 93 and the diameter of the second liner semi-finished product 92 is 1.5 mm.

As a preference, before performing the cutting in B3, the height difference between the upper end of the welding surface 93 and the upper end of the second liner semi-finished product 92 is 8.5 mm.

As a preference, the shaping in A3 includes following step A31.

A31, Stamping and bulging the second shell semi-finished product 82 by using the beef tendon mold to bring the second semi-finished product 82 form the conical structure with a small upper part and a large lower part, herein the difference between the maximum outer diameter of the lower end of the second semi-finished product 82 and the minimum outer diameter of the upper end of the second semi-finished product 82 is 15.4 mm.

Other implementations are the same as the embodiment 1.

Embodiment 2

As a preference, the difference between the diameter of the welding surface 93 and the diameter of the second liner semi-finished product 92 is 1.0 mm.

As a preference, before performing the cutting in B3, the height difference between the upper end of the welding surface 93 and the upper end of the second liner semi-finished product 92 is 8.1 mm.

As a preference, the shaping in A3 includes following step A31.

A31, Stamping and bulging the second shell semi-finished product 82 by using the beef tendon mold to bring the second semi-finished product 82 form the conical structure with a small upper part and a large lower part, herein the difference between the maximum outer diameter of the lower end of the second semi-finished product 82 and the minimum outer diameter of the upper end of the second semi-finished product 82 is 15.0 mm.

Other implementations are the same as the embodiment 1.

In conclusion, the foregoing descriptions are only some preferred embodiments of the present disclosure, and all changes and modifications made in accordance with the scope of the present disclosure shall be covered by the present invention.

What is claimed is:

1. A method for manufacturing double-layer fair mugs, comprising the steps of, a shell (84) processing consisting of:

A1, taking a first round piece (8) for stamping step-by-step thereon to obtain a first shell semi-finished product (81);

A2, performing a cropping operation on the first shell semi-finished product (81) to obtain a second shell semi-finished product (82);

A3, shaping, cutting and flattening for the second semi-finished product (82) to obtain a third shell semi-finished product (83); and A4, notching at the bottom and drilling for the third shell semi-finished product (83) to obtain the shell (84) with a groove (841) and a vacuum hole (842) at the bottom thereon;

a liner (94) processing consist of:

B1, taking a second round piece (9) for stamping step-by-step thereon to obtain a first liner semi-finished product (91);

B2, performing a molding mouth operation for the first liner semi-finished product (91) to obtain a second liner semi-finished product (92), and a mouth of the second liner semi-finished product (92) has a welding surface (93) concave inwardly in its diameter direction; and B3, cutting and flattening for the second liner semi-finished product (92) to obtain the liner (94);

a cup body (101) processing consist of:

C1, performing a mouth matching operation for the shell (84) and the liner (94), and then welding an upper end of the liner (94) onto an upper end of the shell (84) to obtain a cup body semi-finished product (100) with an insulation layer; and C2, polishing a mouth of the cup body semi-finished product (100), and then adopting a water outlet form equipment to the cup body semi-finished product (100) for stamping a water outlet operation to obtain the cup body (101);

wherein the water outlet form equipment comprises an equipment platform (1) movable disposed, a driving component (2), a water outlet form block (3), an adjusting element (4), a clamping part (5) and a supporting member (6);

wherein the clamping part (5) is movably provided on the equipment platform (1) and the clamping part (5) is further provided with a shaping groove (51); the driving component (2) passes through the supporting member (6), the adjusting element (4) is provided on the driving component (2) and goes through from the supporting member (6);

wherein the water outlet form block (3) is slidingly provided on the adjusting element (4), the driving component (2) drives the adjusting element (4) to slide back and forth in a vertical direction, and the water outlet form block (3) moves synchronously with the adjusting element (4) in a horizontal direction and slides along a direction close to or away from the shaping groove (51); and wherein stamping the water outlet operation consists of:

D1, firstly activating the driving component (2) to move the adjusting element (4) upwardly into place, and then taking the cup body semi-finished product (100) to place on the adjusting element (4);

D2, secondly activating the equipment platform (1) to move the clamping part (5) in a direction close to the adjusting element (4), wherein the clamping part (5) clamps on an outside of the cup body semi-finished product (100) and pushes the adjusting element (4) together with the cup body semi-finished product (100) downwardly into place;

D3, thirdly individually pushing the water outlet form block (3) via the driving component (2) to slide horizontally into place in a direction close to the shaping groove (51), and meanwhile punching the water outlet on the cup body semi-finished product (100) to obtain the cup body (101); and D4, lastly driving the clamping part (5) via the equipment platform (1) to move upward, the driving component (2) drives the adjusting element (4), the cup body (101) and the equipment platform (1) to move upward synchronously, and the driving component (2) stops working when the adjusting element (4) and the cup body (101) move upwardly in place; the equipment platform (1) continues to move upward until the clamping part (4) is detached from the cup body (101), at this time the equipment platform (1) stops driving the clamping part (5) upward, and then the cup body (101) is removed and vacuumed to obtain a double-layer fair mug.

2. The method for manufacturing double-layer fair mugs according to claim 1, wherein a difference between a diameter of the welding surface (93) and a diameter of the second liner semi-finished product (92) ranges from 0.5 mm to 1.5 mm.

3. The method for manufacturing double-layer fair mugs according to claim 1, wherein before performing the cutting in B3, a height difference between an upper end of the welding surface (93) and an upper end of the second liner semi-finished product (92) ranges from 7.7 mm to 8.5 mm.

4. The method for manufacturing double-layer fair mugs according to claim 1, wherein the shaping in A3 comprises steps of,
- A31, stamping and bulging the second shell semi-finished product (82) by using a beef tendon mold to bring the second semi-finished product (82) form a conical structure with a small upper part and a large lower part, wherein a difference between a maximum outer diameter of a lower end of the second semi-finished product (82) and a minimum outer diameter of an upper end of the second semi-finished product (82) ranges from 14.6 mm to 15.4 mm; and
- A32, performing a water swelling operation to stretch the second semi-finished product (82), so that a bottom of the second semi-finished product (82) forms a platform protruding towards an interior of the shell.

5. The method for manufacturing double-layer fair mugs according to claim 1,
- wherein the groove (841) is provided several, all grooves are recessed towards the interior of the shell (84), and the grooves (841) are distributed at a bottom of the shell (84) along a direction of a diameter of the shell (84);
- wherein the grooves (841) have different radii, a groove having a largest radius is distributed at a bottom center of the shell (84), and the other grooves (841) are distributed on both sides of the groove (841) having the largest radius in order of radius from the largest to the smallest; and
- wherein the vacuum hole (842) and the groove having the largest radius are coaxially disposed with the shell (84).

6. The method for manufacturing double-layer fair mugs according to claim 1,
- wherein the adjusting element (4) comprises an adjusting column (41) and a placing table (42), the placing table (42) is provided on the adjusting column (41), the placing table (42) is provided with a horizontal chute (420), and the water outlet form block (3) is slidably provided in the horizontal chute (420);
- wherein the adjusting column (41) is slidably provided with a push rod (43) inside, a top of the push rod (43) is provided with a thrust block (44) protruding from a top of the placing table (42), a lower end of the push rod (43) is disposed on the driving component (2), and the driving component (2) drives the push rod (43) and the thrust block (44) reciprocating slip in the vertical direction; and
- wherein a side of the thrust block (44) facing the horizontal chute (420) is provided with a thrust bevel (440), a top of the thrust bevel (440) is inclined away from the horizontal chute (420), and the thrust bevel (440) is provided with a dovetail groove (441) extending along a height of the thrust block (44), the water outlet form block (3) is provided with a dovetail joint (31) dovetailed into the dovetail groove (441), and the thrust block (44) drives the water outlet form block (3) through the dovetail groove (441) and the dovetail joint (31) for synchronized sliding in the horizontal direction.

7. The method for manufacturing double-layer fair mugs according to claim 6, wherein the adjusting element (4) further comprises a positioning block (45) disposed on the placing table (42), the positioning block (45) is provided with a movable slot (451), the water outlet form block (3) and the thrust block (44) are slidably provided in the movable slot (451); and
- wherein the positioning block (45) is circumferentially provided with a faying surface (452) outwardly protruding on an outer side wall thereof, the faying surface (452) is adherent to an inner surface of the welding surface (93), and the clamping part (5) is clamped to an outer side of the positioning block (45).

8. The method for manufacturing double-layer fair mugs according to claim 6, wherein the driving component (2) comprises a water outlet driving member (21) and a cup body driving member (22), the water outlet driving member (21) is threadedly connected with the push rod (43), an upper end of the cup body driving member (22) is disposed on the adjusting column (41), and the cup body driving member (22) drives the adjusting element (4) reciprocating motion in the vertical direction.

9. The method for manufacturing double-layer fair mugs according to claim 6, wherein the clamping part (5) comprises at least two clamping flaps (52), the clamping flaps (52) are circumferentially surrounded and moving in a direction close to or away from each other, and the shaping groove (51) is disposed on an inner side wall of one of the clamping flaps (52); and
- wherein the clamping part (5) further comprises guide rods (53) corresponding to the clamping flaps (52) one-to-one, one end of the guide rods (53) is disposed on respective corresponding clamping flaps (52), the other end of the guide rods (53) protrudes from the equipment platform (1), the guide rods (53) are sleeved with resilient reset components (54), both ends of the resilient reset components (54) against the guide rods (53) and the equipment platform (1) respectively, and the resilient reset components (54) push the clamping flaps (52) in a direction away from each other.

10. The method for manufacturing double-layer fair mugs according to claim 9, wherein the supporting member (6) is provided with a protecting stand (7) on an upper surface thereon, the protecting stand (7) is provided with a protective chamber (71), and an upper end of the adjusting column (41) penetrates into the protective chamber (71); and
- wherein the protecting stand (7) is provided with a clamping guide surface (72) on an inner side wall thereon, a top of the clamping guide surface (72) is inclined in a direction close to an outer side wall of the protecting stand (7), and the clamping guide surface (72) is in contact with an outer wall of the clamping flaps (52).

11. The method for manufacturing double-layer fair mugs according to claim 9, wherein the equipment platform (1) is provided with a first step (11), the clamping flaps (52) are provided with bar blocks (521), and the clamping flaps (52) are slidably disposed on the first step (11) by means of the bar blocks (521);
- wherein the equipment platform (1) is provided with a bump (12) on a lower surface thereon, and a lower surface of the bump (12) is opened with a cup body fixed groove (13), an inner side wall of the clamping flaps (52) is opened with placement notches (522), and the bump (12) is located between the placement notches (522);

wherein the clamping part (5) is formed in a clamped state and a reset state, and when in the clamped state, adjacent clamping parts (52) are abutted against each other, the bump (12) is inserted into the placement notches (522), the cup body fixed groove (13) is located between the clamping flaps (52) and in contact with an end of the cup body semi-finished product (100), and the bar block (521) moves inwardly along the first step (11); and wherein when in the reset state, the adjacent clamping parts (52) are separated from each other, the bump (12) exits from within the placement notches (522), and the bar block (521) moves outwardly along the first step (11).

\* \* \* \* \*